(12) United States Patent
Williams

(10) Patent No.: X7267
(45) Date of Patent: Oct. 25, 1832

(54) MOCCASINS, SOCKSS

(76) Inventor: Denison Williams

Denison Williams
Letters Patent

The Schedule referred to in these Letters Patent, and making part of the same, containing a description in the words of the said Denison Williams himself of his improvement in the manufacture of Mocasins, Socks, Boots, Shoes, Mittens, Gloves &c. out of Seal Skins

---

The object of this manufacture is to protect the body from the cold & moisture of the air for which fur or hair is the best material, and the seal skin is in many respects preferable to any other. In order to prepare the skin for use, the flesh side is oil dressed, the mode of operation being somewhat similar to that used in dressing buckskin. ——————

—— The composition used by this applicant consists of seal oil, pot ash, pyroligneous acid, & salt & sometimes sal amoniac as the state of the skin may require, the proportions of which are to be varied according to the state of the skin to be dressed, with a solution of which ingredients the skin is infused by the aid of heat & friction until it becomes sufficiently pliable, tough & insoluble in water.

The skin thus prepared, may be used for mittens, gloves, sleigh robes, mocasins & the upper leather or material of socks, shoes, boots, &c. The fur or hair side being turned inward The soles of mocasins & socks to be made of any kind of leather tanned in the usual manner, but not of the thickness of common sole leather, & turned up half an inch or more in order to protect the feet from the wet, & the soles of boots & shoes to be made in the usual manner.

The sole is lined with the same kind of fur or hair skin, which is made to adhere strongly by paste of gum shellac, or other suitable substance, which is put on in sufficient quantity to exclude water.

Allum & some other chemical ingredients may be used for dressing the skin but none answering as well as the seal oil, alkali, pyroligneous acid, salt & sal ammoniac.

The applicant claims as his invention the manufacture of seal skins dressed in the manner above described with the fur or hair on, into socks, mocasins, shoes, sleigh-robes & other winter garments.

Witnesses
Morris M. Davidson
Edw^d. Ratcliff

Denison Williams

[illegible]

(420 words)